United States Patent
Yedid Am et al.

(10) Patent No.: US 11,363,170 B2
(45) Date of Patent: Jun. 14, 2022

(54) PRINTING SYSTEM CALIBRATION APPLYING A DISTORTION TO THE CORRECTION CREATING A DETECTABLE REGION IN THE SECOND OUTPUT

(71) Applicant: HP INDIGO B.V., Amstelveen (NL)

(72) Inventors: Tsafrir Yedid Am, Ness Ziona (IL); Rivay Mor, Ness Ziona (IL); Pavel Blinchuk, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 501 days.

(21) Appl. No.: 16/098,190

(22) PCT Filed: Jul. 20, 2016

(86) PCT No.: PCT/EP2016/067337
§ 371 (c)(1),
(2) Date: Nov. 1, 2018

(87) PCT Pub. No.: WO2018/014955
PCT Pub. Date: Jan. 25, 2018

(65) Prior Publication Data
US 2019/0149699 A1 May 16, 2019

(51) Int. Cl.
*H04N 1/60* (2006.01)
*H04N 1/50* (2006.01)
*H04N 1/00* (2006.01)

(52) U.S. Cl.
CPC ....... *H04N 1/6033* (2013.01); *H04N 1/00031* (2013.01); *H04N 1/00087* (2013.01); *H04N 1/506* (2013.01)

(58) Field of Classification Search
CPC ............ H04N 1/6033; H04N 1/00087; H04N 1/00031; H04N 1/506
See application file for complete search history.

(56) References Cited

U.S. PATENT DOCUMENTS

| | | | |
|---|---|---|---|
| 6,185,402 B1 | 2/2001 | Linssen | |
| 7,239,427 B2 | 7/2007 | Tezuka et al. | |
| 7,697,166 B2 | 4/2010 | Bray et al. | |
| 8,643,920 B2 | 2/2014 | Campbell et al. | |
| 2005/0111018 A1 | 5/2005 | Ueda et al. | |
| 2005/0134874 A1* | 6/2005 | Overall | G03G 15/01 358/1.9 |

(Continued)

FOREIGN PATENT DOCUMENTS

EP  1555581 A2  7/2005

OTHER PUBLICATIONS

Vantram, S.R. et al., Fully Automated Calibration Procedure to Compensate Print Non-uniformities Incurred in Fixed Print-head Array Structures, Jan. 2014, < https://jp.ricoh.com/technology/techreport/39/pdf/RTR39a18.pdf >.

*Primary Examiner* — Christopher Wait
(74) *Attorney, Agent, or Firm* — Michael A Dryja (57) ABSTRACT

Examples of an apparatus and method for use with a printing system are described herein. A correction to be applied to a printing system during print calibration is obtained. A distortion is applied to the correction. A relationship between an expected and measured output of the printing system is determined based on the print performed at least in part on the distorted correction. The printing system is calibrated on the basis of the determined correction.

17 Claims, 6 Drawing Sheets

(56) References Cited

U.S. PATENT DOCUMENTS

2013/0286071 A1 10/2013 Armbuster et al.
2016/0078324 A1* 3/2016 Yedid Am .......... G03G 15/5062
358/1.15

* cited by examiner

| 1 | 1 | 1 | 1 | 1 | 1 | 1 | 1 | 1 | 1 |
|---|---|---|---|---|---|---|---|---|---|
| 1 | 1 | 1 | 1.1 | 1.1 | 1.1 | 1.1 | 1 | 1 | 1 |
| 1 | 1 | 1 | 1.1 | 1.1 | 1.1 | 1.1 | 1 | 1 | 1 |
| 1 | 1 | 1 | 1 | 1 | 1 | 1 | 1 | 1 | 1 |

PRINTING SYSTEM CALIBRATION APPLYING A DISTORTION TO THE CORRECTION CREATING A DETECTABLE REGION IN THE SECOND OUTPUT

BACKGROUND

Printing system calibration is the process of adjusting a printing system to achieve a desired printed output. For a given property associated with a printed output, such as color uniformity, the calibration process may have to be iterated multiple times to achieve the desired output. In particular, the standard calibration process of measuring the property from a test print, determining a correction to be applied to the printing system and then applying the correction to the printing system to calibrate it does not necessarily produce the desired output since the parameters of the printing system which can be adjusted for calibration are not the only variables which affect the final printed output.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples Printing systems use calibration to correct for discrepancies which occur during the printing process. In particular, printer calibration is used to improve or maintain the quality of a printed output matches a desired or expected quality. As part of a calibration process, parameters of the printing system are modified to account for the discrepancies.

Some calibration processes comprise the steps of printing a test print where the printing system is operating under a set of parameters and known input print conditions. Following the printing of a test print, a measurement is performed to determine whether the printing system is printing the desired output or whether the printing system is in need of recalibration. Once the measurement has been performed, a correction to be applied to the printing system can be determined. The correction comprises adjusting parameters of the printing system to achieve the expected output according to the test print.

The application of the correction to the printing system should produce a printed output which matches the desired output. However, there can be a discrepancy between the corrections applied during calibration and the measurement obtained during calibration, since the application of the correction does not necessarily produce the correct output. This is because there can be additional variable factors beyond the control of the print controller which contribute to non-uniform effects and printing errors. In particular, the expected locations of the application of a correction compared to the actual printed locations may not be synchronized.

The methods and systems described herein synchronize between the measurements obtained from a printed output during calibration and the output from an application of a correction as will now be described. According to an example, a print controller controlling a printing system receives a first measurement from a test print and determines a correction to be applied to the printing system. The print controller adds a distortion to the correction. The distortion to the correction comprises modifying the correction such that a region is created on the printed output. The region is detectable using image processing techniques. Any discrepancies between the locations on the printed output of the printing system after application of a correction and the measurements obtained from the printed output can be corrected for by measuring a printed output with the distortion. In particular, the effect of the distortion is recognisable as a sub-region of a printed region. This can be used to calibrate the printing system.

This calibration process may be repeated in successive iterations until convergence is achieved and the printed output, the measured output and the output resulting from the application of a correction between the measured output and desired output all synchronize. This helps ensure that the highest possible quality of printing from the printing system following calibration.

The methods and systems described herein relate to calibration of a number of properties associated with laser printing systems; however, the methods are equally applicable to any calibration process in any known printing system. For example, a process of calibrating for color plane registration (CPR) is described. CPR calibration sets several printing system parameters including the starting position at the top of a page where ink is first deposited, the horizontal scanning start position, and also scale in the scan direction. CPR calibration may be used with any printing system and is not limited to laser printing systems. In a further example, a method of calibration for color uniformity is described. In this case, the corrections correspond to corrections to the control of deposition of inks on a printing substrate to achieve a uniform output for a particular color. Similarly to the case of CPR calibration, the method for color uniformity calibration described herein is applicable on any printing system, however an example is described with respect to a laser printing system.

Figure 1:
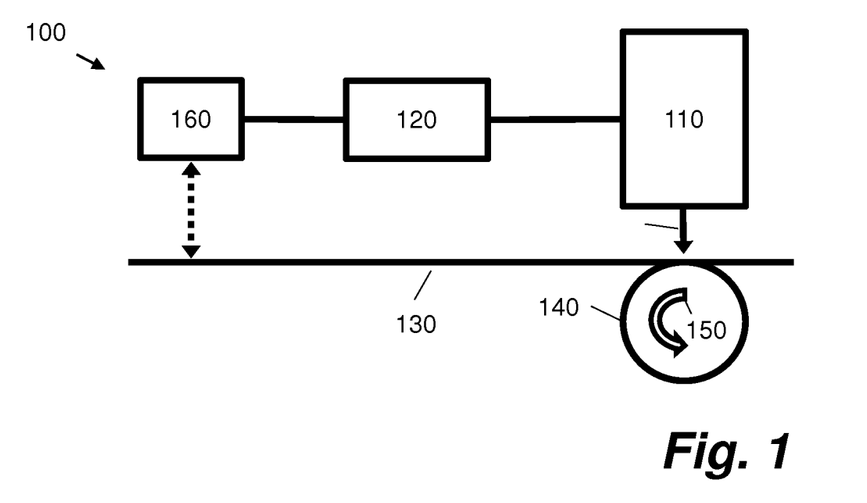
FIG. 1 is a schematic diagram showing a printing apparatus according to an example.

FIG. 1 is a simplified schematic diagram of an apparatus 100 according to an example. The apparatus 100 shown in FIG. 1 comprises a printing device 110. The printing device 110 is communicatively coupled to a print controller 120. In the apparatus shown in FIG. 1, the printing device 110 is arranged to print ink on a printed output 130. The print controller 120 is arranged to instruct the printing device 110 to perform a print in order to achieve a desired printed output. The print controller 120 calibrates the printing device 110 to known print conditions to achieve the desired output. Calibrating the printer to achieve a desired output comprises instructing a modification of one or more parameters of the printing device 110. For example, the print controller 120 modifies parameters of the printing device 110 by sending a control signal from the print controller 120 to the printing device 110. In one case, a modification of parameters of the printing device affects the arrangement of components of the printing device hardware, such as e.g. the relative position of a print head with respect to the printed output. In another example, an instruction sent to the printing device relates to a parameter controlling one or more properties relating to the deposition of ink on a printed output.

The printed output 130 is arranged to move with respect to the printing device 110. The motion of the printed output with respect to the printing device causes inks to be deposited at locations in the direction of movement of the printed output. According to an example, one or more components of the printing device 110 are arranged to move in a direction perpendicular to the direction of movement of the printed output with respect to the printing device 110 to cause inks to be deposited across the width of the printed output 130. In FIG. 1, the cylinder 140 is arranged to rotate in the direction represented by the arrow 150 to cause the printed output to move with respect to the printing device 110. The apparatus 100 shown in FIG. 1 is a representative printing apparatus; however, further arrangements are possible. For example, in the case the print controller 120 comprises a hardware module, the print controller 120 may be contained inside or outside the printing device 110. In a further example, the print controller 120 may comprise software which executes on a central processing unit (CPU) of a computing device (not shown in FIG. 1) coupled to the printing device 110.

The print controller 120 is communicatively coupled to a measurement device 160. The measurement device 160 is arranged to perform one or more measurements on the printed output 130. According to an example, the measurement device 160 comprises an electrophotometer, an image capturing device and an inline scanner. In particular, the measurement device 160 can measure one or more properties present on the printed output 130. For example, the measurement device 160 can be used to determine positions where ink has been deposited on the printed output 130. In another example, the measurement device 160 is used to determine color properties of the printed output 130.

When the print controller 120 initially instructs the printing device 110 to print according to a certain specification, the printing device 110 is setup according to an initial set of parameters. If the printing device 110 was already perfectly calibrated, this would produce the expected output according to the desired specification. The print controller 120 is arranged to receive a first measurement from the measurement device 160. The first measurement is obtained from the test print. The print controller 120 is arranged to determine a correction to be applied to the printing device 110. The corrections are determined on the basis of an expected output of the printing device 110 according to the initial setup as determined by the print controller 120 and the actual measurements received from the measurement device 160.

According to an example, the corrections comprise modifications to parameters to account for errors introduced in the printing process. In the initial setup, parameters associated with the printing device 110 could be, for example, parameters which determine the location of the deposition of inks with respect to horizontal and vertical positions of a printed output 130. In this case, a measurement of the printed output 130 using e.g. image processing techniques may determine a misalignment between the expected output for that set up and the printed output 130, due to non-uniformity in the printing process. For example, in one case the locations of the horizontal position on the printed output where ink is deposited are 1 cm further across the page to the left than the expected location. The correction to be applied to the printing device 110 in such a case comprises a modification to a position of the printing heads of the printing device 110 such that the printing heads deposit ink 1 cm further to the right to account for the misalignment.

In practice, the expected output from the application of the correction which has been determined in response to a first measured output from the measurement device 160 does not necessarily match the actual output following the application of the correction at the printing device 110. This is as a result of non-uniformity arising from application of the correction in the printing hardware of the printing device 110. In the example described previously, a correction to the position of the printing head such that ink is deposited on the page 1 cm further to the right may not result in the ink being deposited in the correct position on the page. As noted previously, this is because the parameters of the printing head which are under the control of the print controller 120 and which can be modified to achieve the desired correction are not the only variables which affect the location of deposition of ink on the printed output 130.

To identify the difference between the expected and actual output, the print controller 120 is arranged to apply a distortion to the correction. In an example, the distortion comprises an additional modification to parameters following a determination of a correction to be applied to achieve a desired output. The print controller 120 instructs the printing device 110 to perform a print based at least in part on the distorted correction. Once the printing device 110 has performed a print with the distorted correction, a second measurement is performed to recognize the effect of the distortion on the correction. In one case, the distortion produces an identifiable region on a printed output 130 in which any discrepancy can be distinguished from the expected output with the distorted correction. The print controller 120 is arranged to calculate a relationship between a second expected output from the application of the correction with the distorted correction and the actual output. The print controller 120 is arranged to calibrate the printing device 110 based on the calculated relationship.

In one case, the print controller 120 is arranged to determine a subsequent correction to be applied to the printing device on the basis of an expected output and a measured output of the print device after a first calibration has been performed. It is possible to perform successive iterations of calibration at the printing device 110. In particular, the printing device 110 can perform printing, measuring, determining a correction and applying a distortion to the correction repeatedly until the output of the printing device 110 synchronizes with an expected output.

Figure 2:
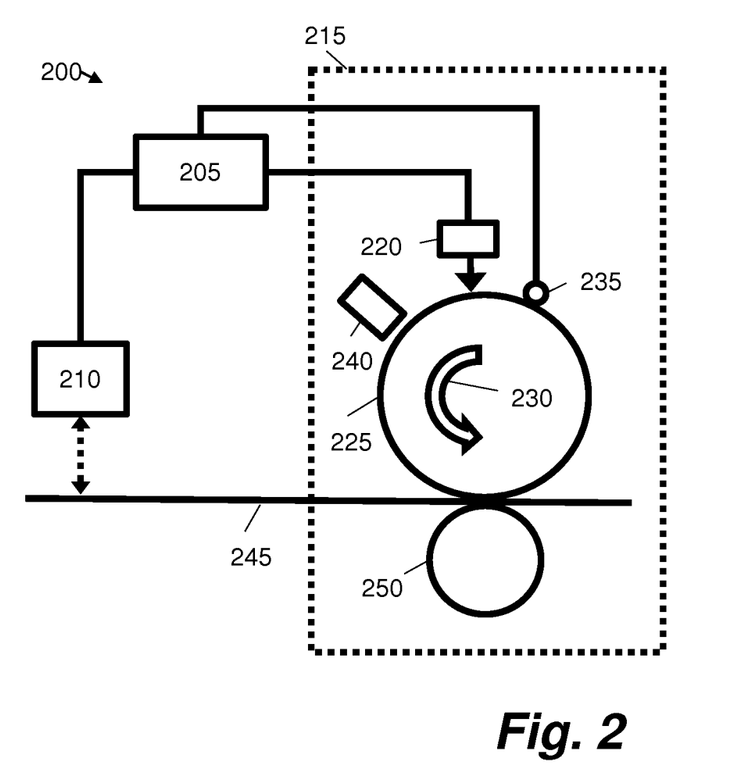
FIG. 2 is a schematic diagram showing a laser printing apparatus according to an example.

FIG. 2 is a simplified schematic diagram of an apparatus 200 according to an example. FIG. 2 shows a print controller 205 communicatively coupled to a measurement device 210 (similarly to the print controller 120 and measurement device 160 shown in FIG. 1). In the example shown in FIG. 2, the print controller 205 is shown communicatively coupled to components of a laser printing system 215. In FIG. 2, the print controller 205 is shown outside of the laser printing system 215. As with the print controller 120 in FIG. 1, the print controller 205 may be implemented as software and/or hardware.

The laser printing system 215 comprises an imaging unit 220 and an encoder 225. The encoder 225 is arranged to rotate in the direction indicated by the arrow 230. The laser printing system 215 comprises a charging element 235 which is in contact with the encoder 225. The charging element 235 may include a charging device, such as corona wire, a charge roller, scorotron, or any other device capable of transferring a voltage to the encoder 225. The charging element 235 is arranged to charge the surface of the encoder 225 as the encoder 225 rotates in the direction indicated by the arrow 230. The charging element 235 is arranged to charge the encoder 225 with a positive (or negative) charge in regions on the surface of the encoder 225. The voltage applied across the surface of the encoder 225 by the charging element 235 shall be referred to herein as the developer voltage. The print controller 205 is coupled to the charging element 235 and can send a control signal indicating that a developer voltage is to be applied to the encoder 225 via the charging element 235 at positions on the surface of the encoder 225.

The imaging unit 220 comprises one or more lasers projecting laser beams towards the surface of the encoder 225. As the encoder 225 continues to rotate, it passes through the path of the laser beams of the imaging unit 220, where the laser beams dissipate localized charge in selected portions of the surface of the encoder 225 to leave an invisible electrostatic charge pattern that corresponds to the image to be printed. The print controller 205 is also arranged to send a control signal to the imaging unit 220. The control signal sent from the print controller 205 to the imaging unit 220 comprises values indicative of a power of the one or more laser beams to be applied at locations on the encoder 225. The electrostatic charge pattern is controlled via the power of the laser beams which is controlled by the print controller 205 with the control signal.

Ink is transferred onto the encoder 225 by at least one image development unit 240. There may be one image development unit 240 for each ink color. During printing, the image development unit 240 presents a uniform film of ink to the encoder 225. The ink contains electrically-charged pigment particles which are attracted to the opposing charges on the image areas of the encoder 225. As the encoder 225 continues to rotate, it comes into contact with the surface of the substrate to produce a printed output 245. The image developed on the surface on the encoder 225 is transferred onto the substrate to generate the printed output 245. The motion of the printed output is controlled via the rotating drum 250.

In an alternative setup, the image development unit 240 deposits ink on the surface of the encoder 225 which transfers the image onto at least one other surface before the image is transferred onto a printing substrate. One example of such a setup in digital offset printing involves transferring the image from the encoder 225 to at least one other rotating drum.

The measurement device 210 is arranged to perform one or more measurements on the printed output 245. Similar to the measurement device 160, measurement device 210 can be one of an electrophotometer, an image capturing device and an inline scanner. The print controller 205 is arranged to receive the one or more measurements from the measurement device 210 and determine corrections to be applied to the laser printing system 215 as part of a calibration process where the corrections are determined on the basis of an expected output of the laser printing system 215 and the received measurements.

Three examples of different calibration processes are described with reference to FIG. 2, which are implemented by the print controller 205 and the laser printing system 215. According to an example implementation, the laser printing system is calibrated for color uniformity. In such examples, the measurement device 210 is arranged to measure the spectral output from the printed output 245. The print controller 205 is arranged to receive the first measurements from the measurement device 210 and determine corrections on the basis of an expected output of the laser printing system 215.

In such example implementations, an expected output in this case corresponds to the laser printing system 215 printing according to a uniform color output for a particular color within the color gamut of the system. For example, in a laser printing system in which the ink development unit 240 produces patterns from cyan, magenta, yellow and white (CMYK) colors, an expected output could be a test print comprising bands of uniform C, M, Y and K colors across a page. The print controller 205 is arranged to determine a correction based on the difference between the measured output and the expected uniform output of each printed ink. The correction comprises a table of values where each value represents the laser power to be applied at a particular location to achieve the uniform output.

In another example, the laser printing system 215 is calibrated for solid uniformity correction. Solid uniformity is the property of achieving a uniform optical density on a printed output. In the example of the laser printing system 215 shown in FIG. 2, the optical density is controlled by application of the developer voltage at the charging element 235. A varying developer voltage generates a region of varying optical density on the surface of the encoder 230. This produces darker and lighter solid regions on the printed output 245.

The measurement device 210 is arranged to perform measurements on the printed output 245 to determine the optical density. In such examples, the print controller 205 is arranged to determine a correction that is applied in the direction of motion of the printed output with respect to the printing device via the charging element 235. The correction to be applied is determined based on a difference between the measured values and the expected output, which in the such examples can be determined as a variation in the developer voltage to achieve solid uniform optical density over a printed region. The print controller 205 is arranged to send a control signal to the charging element 235 to modify a developer voltage applied to the surface of the encoder 230. The correction to be applied may be represented as a graph of developer voltage against the rotation angle of the encoder 225.

According to one example, the laser printing system is calibrated for color plane registration (CPR). CPR calibration sets several printing system parameters including the initial printing locations at the top of page and start of line, i.e. the horizontal and vertical scanning start positions, and also scale in the scan direction i.e. the horizontal scanning magnification. As with the first two examples described, CPR calibration is done by writing patterns on the encoder 225 and then using the measurement device 210 to read the patterns. In this such examples, the measurements correspond to variations in the timing of the patterns. These measurements are sent to the print controller 205 which determines a correction to be applied to compensate for discrepancies occurring at the top of the page, start of line, and scale in the scan direction. The corrections will be a set of triggers for the one or more laser beams in the imaging unit 220 to activate during particular time intervals to achieve the desired output.

In all three examples described above, the application of the correction by the print controller 205 may result in a printed output which does not match the expected output following the correction. This is due to uncertainty between the measured values and the output following the application of the correction. As previously described, to overcome this problem, the print controller 205 is arranged to apply a distortion to the correction to produce a sub-region on the printed output. Following application of the distortion the print controller 205 is arranged to instruct the laser printing system 215 to perform a print based on the application distorted correction and calculate a relationship between the expected output and a second measured output of the laser printing system and the measurement device based on the print performed at least in part on the distorted correction.

Figure 3A:
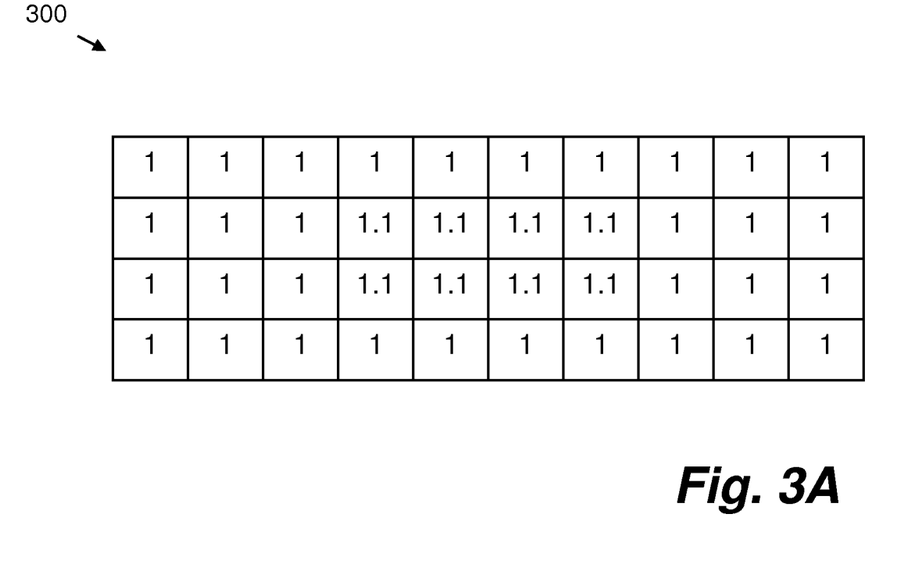
FIG. 3A is a table of values representative of the power of a laser in a laser printing system according to an example.

In examples of color uniformity, the correction comprises values representative of the power of the one or more laser beams of the imaging unit 220 at different positions. The distortion is generated by varying the power of the one or more laser beams in the imaging unit 220. FIG. 3A shows a table 300 comprising values representative of laser power to be applied to the encoder 225 at different coordinates according to an example. The table 300 is representative of values sent in a control signal from the print controller 205 to the imaging unit 220 in FIG. 2. The higher values in the middle of the table are representative of the distortion to be applied by the print controller 205 to the correction.

Figure 3B:
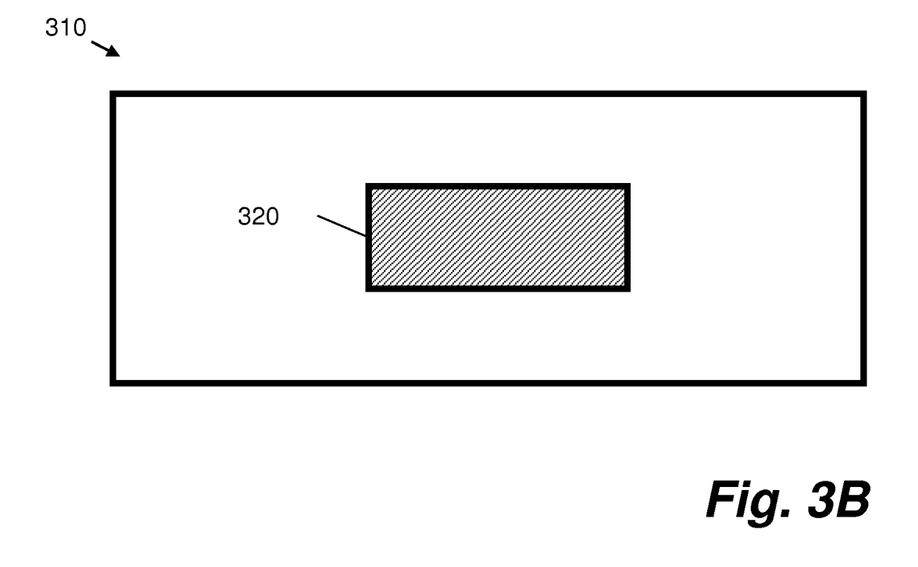
FIG. 3B is a schematic diagram showing a printed output of a printing system according to an example.

The printed output 310 in this case is shown in FIG. 3B. The sub-region 320 shown in the middle of the printed output 310 shows the effect of the distortion applied to the correction. Any vertical or horizontal displacement of the sub-region 320 shown in the middle of the region 310 from the expected location as determined from the location according to the table 300 can be recognized as a measurement by e.g. a measurement device such as measurement device 210 or, alternatively by other techniques such as image processing. The print controller 205 can instruct a modification to one or more printing parameters to calibrate the system to account for the displacement.

Figure 4A:
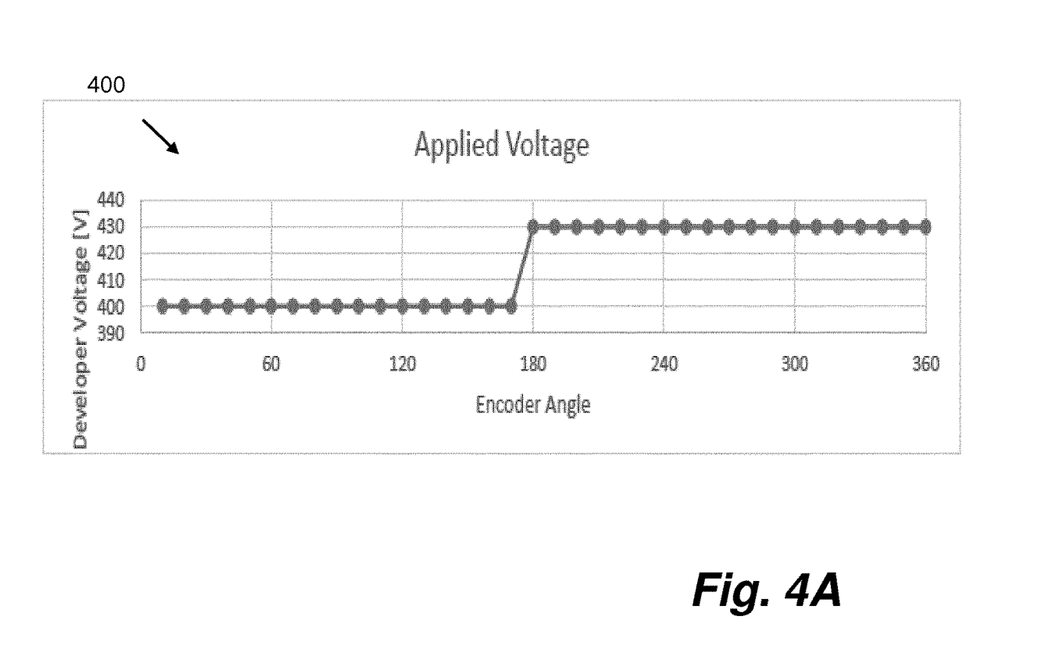
FIG. 4A is a graph of a voltage applied across an encoder in a laser printing system according to an example.

The laser printing system is calibrated for solid uniformity. As described previously, solid uniformity relates to the uniformity of the optical density of a printed output and is controlled at least in part by the developer voltage which is applied at the charging element 235. It can be varied via a control signal sent from the print controller 205 to the charging element 235. FIG. 4A shows a graph according to one example, where the developer voltage is varied to achieve a solid uniformity.

Figure 4B:
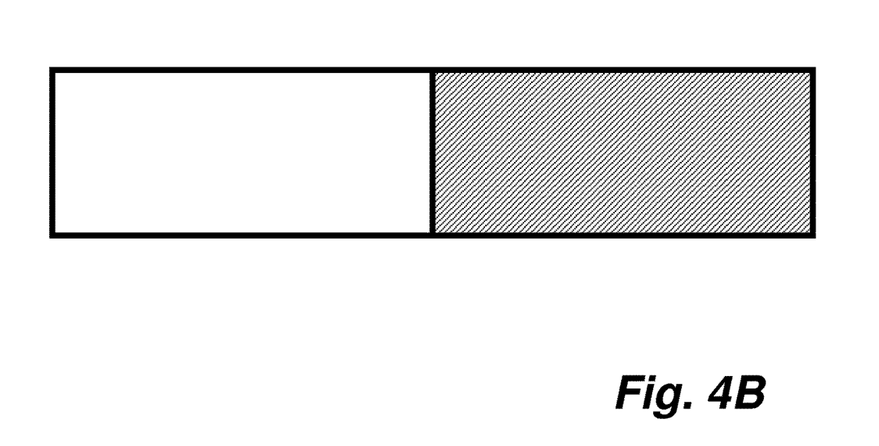
FIG. 4B is a schematic diagram showing a printed output of a printing system according to an example.

The graph 400 shown in FIG. 4 shows a plot of the encoder angle along the X-axis vs the developer voltage against the Y-axis. According to the example shown in FIG. 4, the distortion corresponds to a sharp intended change in the developer voltage: the developer voltage is increased from 400V to 430V when the encoder 225 is rotated 180 degrees from the starting position. This can be detected by the measuring device 210. The effect of the sharp increase in developer voltage is represented in FIG. 4B. The contrasting regions shown in FIG. 4B represent the lower and higher optical densities on a printed output.

In the case of CPR calibration, the first measurement received at the print controller 205 may for example determine that a correction of 1 second is to be applied to achieve the correct start-of-line position in the horizontal scan direction on the page. However, sending a control signal from the print controller 205 to the imaging unit 220 to trigger the one or more laser beams 1 second later does not necessarily produce the correct start of line position on the printed output 245 because the laser beam timing is not the only factor affecting the start of line position in the horizontal scan direction.

Similarly to the previous examples described for solid uniformity and color uniformity calibration, the print controller 205 is arranged to add a distortion to the correction. The distortion to be applied may comprise triggering the one or more laser beams of the imaging unit 220 1.1 seconds later over a sub-region of the region where the correction is to be applied, to generate a distinct and recognizable area on the printed output 245. Any displacement between the measured and expected output can then be accounted for and the laser printing system 215 can be calibrated accordingly.

Figure 5:
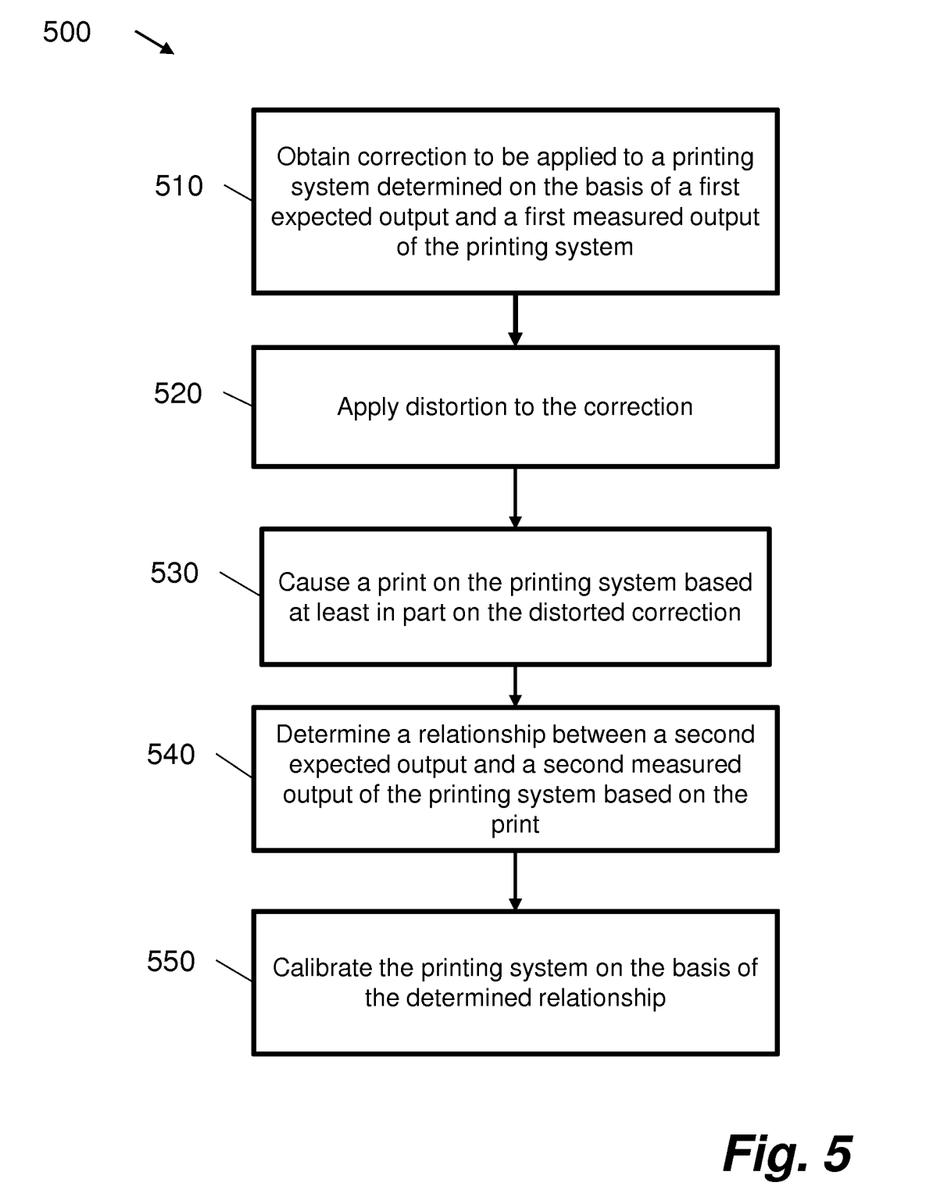
FIG. 5 is a flow diagram showing a method of calibrating a printing system according to an example.

FIG. 5 is a flow diagram showing an example method 500 for use with a printing system according to an example. The method 500 can be performed on the apparatus 100 and 200 shown in FIGS. 1 and 2 and may be implemented at a print controller such as the print controllers 120 and 205 in FIGS. 1 and 2 respectively. At step 510, a correction to be applied to a printing system is obtained. The correction is determined on the basis of a first expected output and a first measured output of the printing system. The correction may be determined at a print controller as previously described. Alternatively, the correction may be received by a print controller, e.g. as an instruction from a device external to the printing system and arranged to determine corrections based on measured and expected values.

At step 520, a distortion is applied to the correction. For example, a distortion may be applied to the correction at a print controller which has obtained the correction as described herein. Following application of the distortion to the correction, at step 530, a print on the printing system is printed based at least in part on the distorted correction. In the context of the printing systems shown in FIGS. 1 and 2, a print controller can send a signal to cause a print at a printing device. At step 540, a relationship is determined between a second expected output and a second measured output of the printing system based on the print. At step 550, the printing system is calibrated on the basis of the determined relationship.

Figure 6:
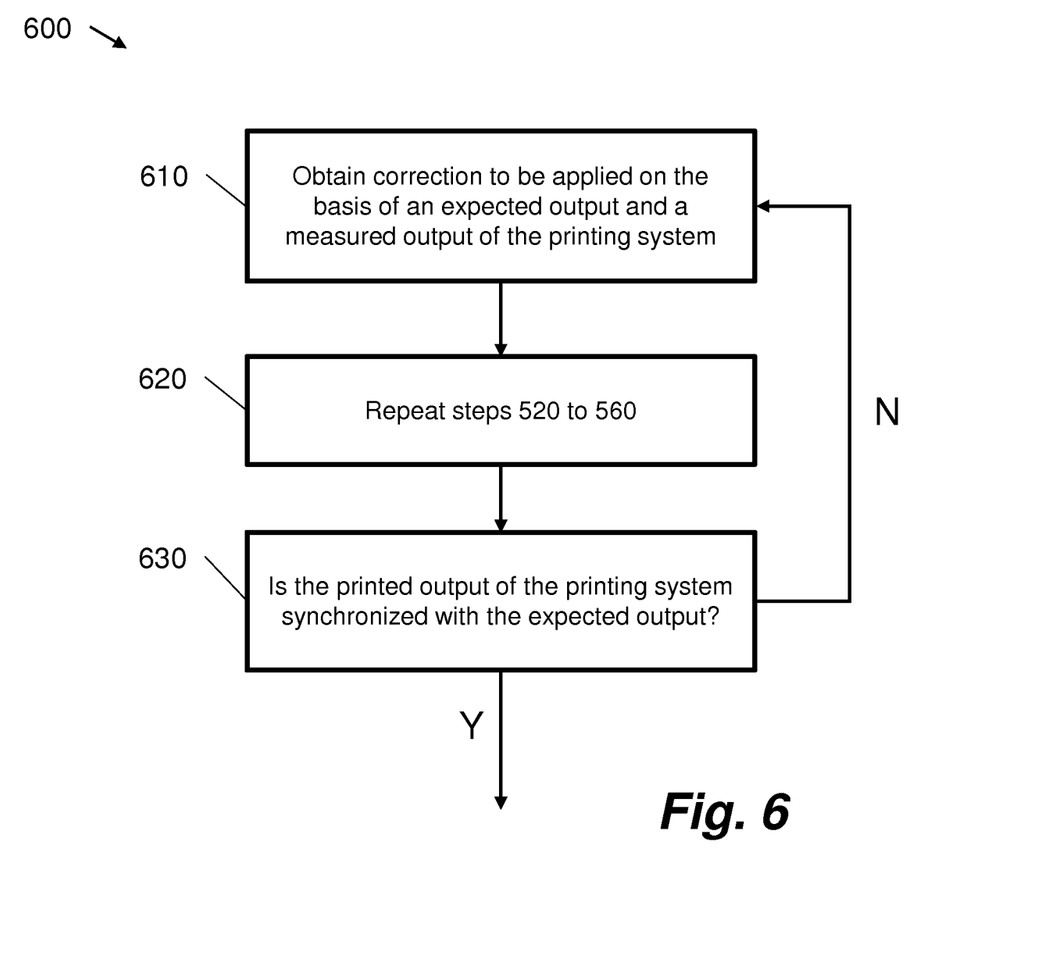
FIG. 6 is a flow diagram showing a method of synchronizing a printing system with an expected output according to an example.

FIG. 6 is a flow diagram showing an example method 600 of synchronizing a printing system. The method 600 shown in FIG. 6 may be used in conjunction with the printing systems and apparatus described herein. The steps 610 to 630 shown in FIG. 6 may be performed at a print controller as described in FIGS. 1 and 2. At step 610, a correction to be applied on the basis of an expected output and a measured output of the printing system. At step 620, the steps 520 to 560 in FIG. 5 are performed resulting in the printing system being calibrated on the basis of a relationship determined from the expected output and actual output following application of the distorted correction. At step 630, it is determined whether the output of the printing system is synchronized with the expected output.

If it is determined that the printed output of the printing system is synchronized with the expected output, then the printing system is deemed synchronized. On the other hand, if it is determined that the printed output of the printing system is not synchronized, then the method returns to step 610. In particular, a subsequent correction is obtained on the basis of an expected output and a measured output of the printing system after the first calibration and the process is repeated. Successive iterations of the steps 610 to 630 of the method 600 can be performed until the output of the printing system synchronizes to an expected output.

In examples described herein, the example methods 500 and 600 shown in FIGS. 5 and 6 are used in calibration of one or more of color uniformity, solid uniformity and color plane registration properties.

According to one example, the relationship between the second expected output and second measured output of the printing system is determined from the expected position and measured position of ink deposited on a print substrate. In one example implementation, the distortion to the correction comprises varying application of the one or more lasers over a sub-region of the printed substrate. Varying the power of the laser generates a printed output which is detectable using image processing. In another example implementation, application of the distortion to the correction according to the method 500 shown in FIG. 5 comprises application of a developer voltage to the encoder on the basis of a position of the encoder.

Methods and systems described herein provide a means of synchronizing between a correction to be applied by a printing system and measurements obtained from the printed output. The methods described include the use of a "distortion" applied to a correction during the calibration process. The distortion creates an identifiable region of the printed output which can be used to synchronize with the correction determined from the measured output. Prior approaches make the assumption that the vector which determines the location of the correction on the printed output should be unique and well-defined. In particular, such prior art approaches overlook the uncertainty in synchronization between the measurements and the applied correction. The examples described herein address this problem and improve the quality of printed output.

Figure 7:
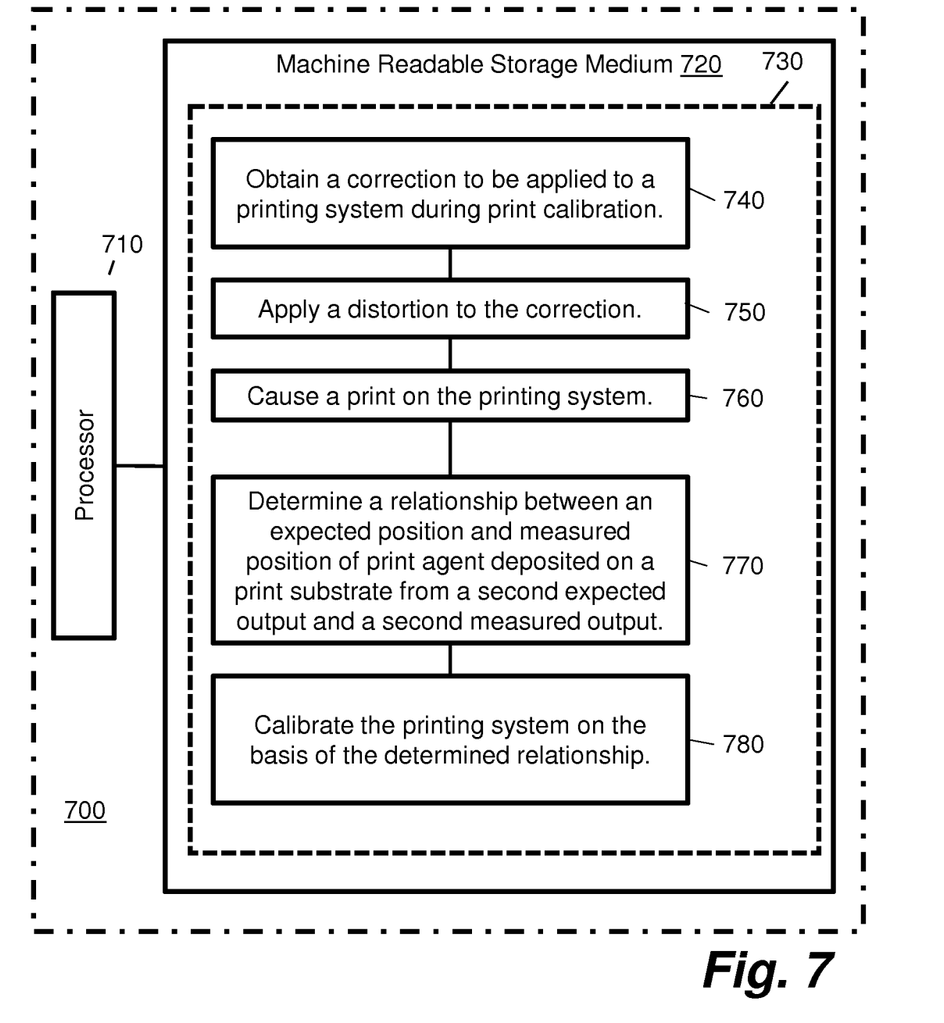
FIG. 7 is a block diagram of a computing system according to an example.

Certain methods and systems as described herein may be implemented by one or more processors that process program code that is retrieved from a non-transitory storage medium. FIG. 7 shows an example 700 of a device comprising at least one processor 710 coupled to machine-readable storage medium 720. Machine-readable media 720 can be any media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

In FIG. 7, the machine-readable storage medium comprises program code to calibrate a printing system as described in the foregoing examples herein. In particular the machine-readable storage medium 720 comprises program code 730 which causes one or more processors to: obtain a correction to be applied to a printing system during print calibration 740, the correction having been determined on the basis of a first expected output and a first measured output of the printing system; apply a distortion to the correction 750; cause a print on the printing system based at least in part on the distorted correction 760; determine a relationship between an expected position and measured position of print agent deposited on a print substrate from a second expected output and a second measured output of the printing system based on the print performed at least in part on the distorted correction and calibrate the printing system 770; and calibrate the printing system on the basis of the determined relationship 780.

The above examples are to be understood as illustrative. It is to be understood that any feature described in relation to any one example may be used alone, or in combination with other features described, and may also be used in combination with one or more features of any other of the examples, or any combination of any other of the examples. Furthermore, equivalents and modifications not described above may also be employed.

The invention claimed is:

1. A method for use with a printing system, the method comprising:
    obtaining a correction to be applied to a printing system during print calibration, the correction having been determined on the basis of a first expected output and a first measurement of a first output of the printing system;
    applying a distortion to the correction, the distortion modifying the correction;
    causing a print on the printing system based at least in part on the distorted correction, to generate a second output of the printing system, the distortion creating a detectable region in the second output;
    determining a relationship between a second expected output and a second measurement of the second output of the printing system, by recognizing an effect of the distortion within the second output; and
    calibrating the printing system on the basis of the determined relationship.

2. The method of claim 1 comprising:
    obtaining a subsequent correction to be applied on the basis of an expected output and a measured output of the printing system after the calibration.

3. The method according to claim 2, comprising performing successive iterations of the steps of claim 1 until an output of the printing system synchronizes to an expected output.

4. The method according to claim 1, wherein calibrating the printing system comprises instructing a modification of one or more parameters of the printing system.

5. The method according to claim 1 wherein the correction applied in relation to one or more of color uniformity, solid uniformity and color plane registration.

6. The method according to claim 1 wherein
    the printing system is a laser printing system comprising one or more lasers and an encoder, and
    the relationship between the second expected output and second measured output is determined from the expected position and measured position of ink deposited on a print substrate.

7. The method according to claim 6 wherein applying the distortion to the correction comprises varying application of the one or more lasers over a sub-region of the print substrate.

8. The method of claim 7, wherein varying application of the one or more laser comprises varying the power of the one or more lasers to generate a printed output in the sub-region which is detectable using image processing.

9. The method according to claim 6 wherein applying the distortion to the correction comprises varying application of a developer voltage to the encoder on the basis of the encoder position.

10. An apparatus comprising:
    a printing device;

a measurement device arranged to perform measurements on a printed output of the printing device;

a print controller communicatively coupled to the printing device and measurement device arranged to:

receive a first measurement from the measurement device, the first measurement of a first output of the printing device;

determine a correction to be applied to the printing device on the basis of a first expected output of the printing device and the first measurement;

apply a distortion to the correction, the distortion modifying the correction;

instruct the printing device to perform a print based at least in part on the distorted correction, to generate a second output of the printing device, the distortion creating a detectable region in the second output;

calculate a relationship between a second expected output and a second measurement of the second output of the printing device, by recognizing an effect of the distortion within the second output; and calibrate the printing device on the basis of the calculated relationship.

11. The apparatus according to claim 10 wherein the print controller is arranged to determine a subsequent correction to be applied on the basis of an expected output and a measured output of the print device after the calibration.

12. The apparatus according to claim 11 wherein the print controller is arranged to perform successive iterations of the calibration process of claim 10 until the output of the print device synchronizes to the expected output of the print device.

13. The apparatus of claim 10 wherein the print device is a laser printing device comprising at least one laser and an encoder and wherein a calibration of the print device is a calibration of the at least one laser and/or the encoder.

14. The apparatus of claim 10 wherein the measurement device comprises one of an electrometer, a spectrophotometer, an image capturing device and an inline scanner.

15. A non-transitory computer-readable storage medium storing instructions that, when executed by one or more processors, cause the one or more processors to:

obtain a correction to be applied to a printing system during print calibration, the correction having been determined on the basis of a first expected output and a first measurement of a first output of the printing system;

apply a distortion to the correction, the distortion modifying the correction;

cause a print on the printing system based at least in part on the distorted correction, to generate a second output of the printing system, the distortion creating a detectable region in the second output;

determine a relationship between a second expected output and a second measurement of the second output of the printing system, by recognizing an effect of the distortion within the second output; and calibrate the printing system on the basis of the determined relationship.

16. The method of claim 1, wherein application of the distortion and determining the relationship compensates for uncertainties that would otherwise result between the second output and the second expected output due to uncontrollable factors of the printing system.

17. The method of claim 16, wherein the distortion comprises additional modifications to those of the correction.

* * * * *